(12) United States Patent
Dumstorff et al.

(10) Patent No.: US 7,014,444 B2
(45) Date of Patent: Mar. 21, 2006

(54) INTEGRAL KEY FOB

(75) Inventors: Kevin Dumstorff, High Ridge, MO (US); John Simpson, Potosi, MO (US)

(73) Assignee: MOCAP Incorporated, St. Louis, MO (US)

( * ) Notice: Subject to any disclaimer, the term of this patent is extended or adjusted under 35 U.S.C. 154(b) by 630 days.

(21) Appl. No.: 09/935,983

(22) Filed: Aug. 23, 2001

(65) Prior Publication Data

US 2002/0027311 A1 Mar. 7, 2002

Related U.S. Application Data

(60) Provisional application No. 60/227,351, filed on Aug. 24, 2000.

(51) Int. Cl.
*B29C 45/26* (2006.01)

(52) U.S. Cl. ...................... 425/182; 425/190

(58) Field of Classification Search .......... 425/182, 425/190
See application file for complete search history.

(56) References Cited

U.S. PATENT DOCUMENTS

| | | | | | |
|---|---|---|---|---|---|
| 5,012,568 | A | * | 5/1991 | DiSimone et al. | 29/402.08 |
| 5,662,946 | A | * | 9/1997 | Pratt et al. | 425/190 |
| 5,824,249 | A | * | 10/1998 | Leitch et al. | 264/219 |
| 6,065,950 | A | * | 5/2000 | Spiess | 425/11 |
| 6,116,886 | A | * | 9/2000 | Tasaka | 425/183 |
| 6,328,552 | B1 | * | 12/2001 | Hendrickson et al. | 425/188 |

\* cited by examiner

*Primary Examiner*—Duane Smith
*Assistant Examiner*—Emmanuel S. Luk
(74) *Attorney, Agent, or Firm*—Paul M Denk

(57) ABSTRACT

A fully integrated key fob wherein its base portion and extending tab are injection molded together, to form an integral structure. The extending tab has an aperture also molded therethrough, and into which and through the key ring may be inserted, for retention of other miscellaneous items to the key ring, during usage. Also disclosed is an apparatus and method for making the key fob.

1 Claim, 2 Drawing Sheets

INTEGRAL KEY FOB

This application claims the benefit of Provisional Application No. 60/227,351, filed Aug. 24, 2000.

BACKGROUND OF THE INVENTION

There are a large variety of fobs that are available upon the market, for holding keys, or any variety of miscellaneous items, usually within the pocket, or the purse. Generally, these fobs include a base member, which frequently contains some form of advertising, and then has clipped to it, through a manually applied clasp, a ring, upon which keys, or other items, may be located. These types of key fobs are readily available from a variety of sources, whether it be for purchase in the store, or obtained as promotional items from suppliers.

SUMMARY OF THE INVENTION

This current invention contemplates the formation of an integrally formed key fob, one that may be completely molded as a one-piece item, and eliminates the need for a separate attachment of a clasp to it, when appending a ring to the fob for usage.

The principal object of this invention is to provide an integral, fully molded, one-piece fob, that can easily have a ring applied to it, for holding keys, or the like.

This invention includes a polymer molded type of fob. The polymer molding can undertake any shape, for the main structure of the fob itself, and also has integrally molded with it an extending tab, incorporating an aperture therethrough, and to which a key ring may be located, for holding other items such as keys, a miniature flashlight, or many of the other and variety of items that are normally appended from a key chain. The essence of this invention is the formation of a singular, one-piece, fob, generally molded of a polymer, of many textures, whether it be flexible type, or even in a more rigid polymer, that is used to form the basics of the fob itself, and has integrally molded therewith a tab that incorporates an integral aperture, and through which the key ring may be applied, during usage.

It is, therefore, an object of this invention to provide a fully integrated one-piece key fob.

Another object of this invention is to provide a key fob which includes an integral tab, and to which the key ring is applied, through its aperture, for holding keys and other miscellaneous items.

Still another object of this invention is to provide for the one-piece molding of a key fob, which thereby eliminates the need of extra manual labor to apply the key ring, by means of a clasp, to the fob, when assembled for sale and usage.

Still another object of this invention is to provide a streamlined key fob that may be formed of a variety of polymers, and to which a key ring may be directly applied, without necessitating further connectors.

Still another object of this invention is to provide a method and apparatus for making key fobs having different shape and size without using an entirely different mold.

These and other objects may become more apparent to those skilled in the art upon review of the summary of the invention as provided herein, and upon undertaking a study of the description of its preferred embodiment, in view of the drawings.

DESCRIPTION OF THE PREFERRED EMBODIMENT

Figure 1:
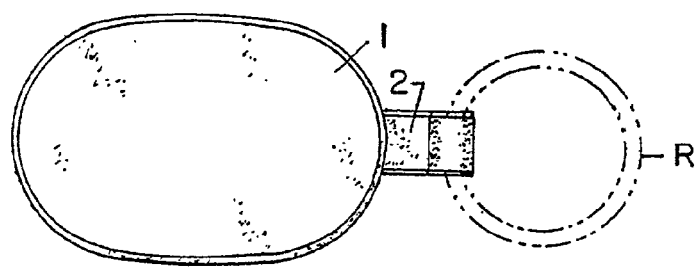
FIG. 1 is a plan view of the key fob of this invention, showing, in phantom line, the key ring applied thereto.
Figure 2:
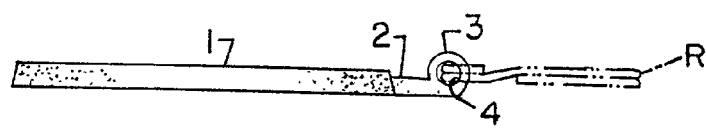
FIG. 2 is a side view thereof.
Figure 3:
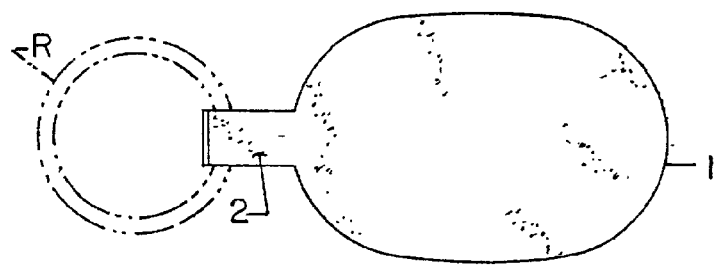
FIG. 3 is a bottom view thereof.
Figure 4:
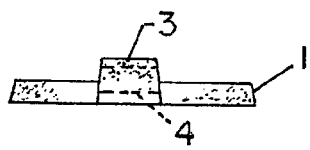
FIG. 4 is a front view thereof.
Figure 5:
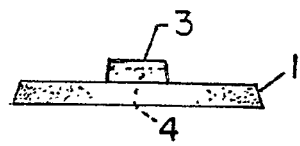
FIG. 5 is a rear view thereof.

In referring to the drawings, and in particular FIG. 1, the fully integrated key fob 1 of this invention is readily disclosed. It is shown as having a base portion which is generally of an oval shape, as noted, and to which any type of indicia may be printed, such as advertising, or any other type of text or pictorial matter. Fobs of this type are readily available in the art, many of them molded of a polymer, but in this particular instance, the fob may be molded of any polymer that may be flexible, or even a rigid polymer, to form the base portion of this particular designed fob. More particularly, this fob is fully integrated, and incorporates, integrally, an extending tab 2, which is molded directly to the base portion 1, as can be seen. The front end of the fob is curled, generally as noted at 3, and is molded having an aperture, as at 4, provided therethrough, as noted. It is through this aperture that a key ring, such as shown at R, may be inserted to provide for the fully assembled key fob, as can be readily understood. Essentially, the essence of this invention is the integration of the tab 2, having its key ring holding portion 3, molded directly to the base portion 1, in a one-step operation. Thus, as is well known in the art, when fobs of this type are constructed, usually just the base portion alone is fabricated, has a hole in it, and then a clasp (not shown), as known in the art, whether it be of plastic itself, or metal, may be used for holding a key ring, and applied directly to the base portion of the fob, when assembled. This necessitates an entirely additional step in the fabrication of a fob of the prior art type, which adds to its cost of manufacture. Requiring labor under such circumstances does add to the cost of an assembled fob. In addition, frequently, these types of clasps, not being of the industrial type, can open, on their own, thereby presenting a loss of keys, in some instances, or the separation of the key ring from the fob ultimately. The purpose of this current invention is to alleviate that type of problem, so that the key ring, when applied to the apertured tab, as explained in this current invention, is fully integrated with the fob, and cannot separate therefrom.

The type of polymer used in the injection molding of the fully integrated key fob of this invention are well known in the art. Such polymers may be of a more flexible type, such as polyvinyl, or be resilient in their structure, even after their molding, or the fob may be fabricated from a more thermal set type of polymer, which may add rigidity to the fob when assembled and used. Nevertheless, and regardless which type of polymer may be used in fabrication and assembly of the fob of this invention, may provided greater security for retention of the key ring, and any applied keys, charms, miniaturized flashlight, or any other item that is normally applied to a key ring of this type.

Figure 6:
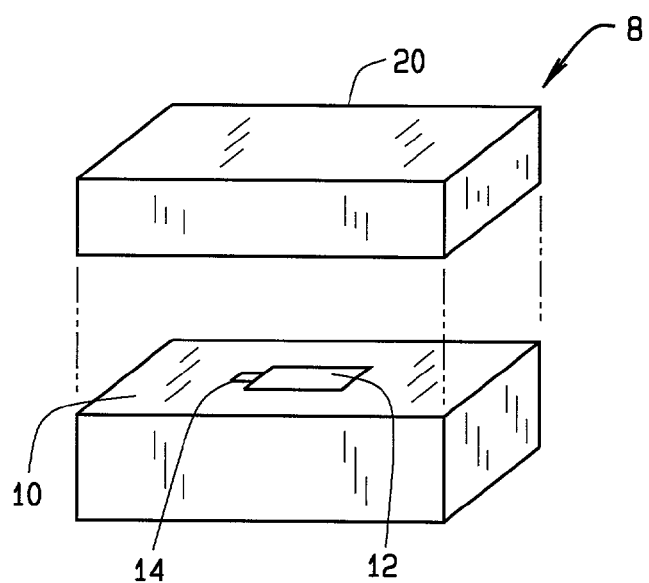
FIG. 6 is a perspective view of a molding machine for molding the one-piece key fob according to an embodiment of the present invention.
Figure 7:
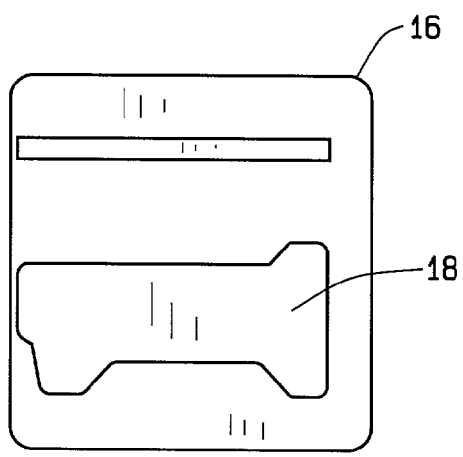
FIG. 7 is a plan view of a key blank for the molding machine of FIG. 6.
Figure 7:
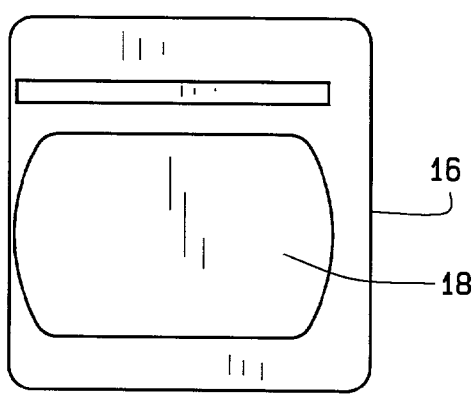

Referring to FIG. 6, a key fob according to the present invention may be molded by an injection mold 8 having a mold portion 10 defining a mold blank recess 12. The mold portion 10 also defines a mold portion cavity 14. Additionally, several mold blanks 16 are provided (FIG. 7) which define mold blank cavities 18. The mold blank cavities 18 of each mold blank 16 are shaped differently to provide base portions 1 of different sizes, shapes. The mold blank 16 providing the desired base portion 1 is selected and inserted into the mold blank recess 12. The mold blank recess 12 and the mold portion cavity 14 together form a unified molding cavity for molding the key fob. Next, a molding cavity cover 20 is lowered, and a melted polymer is injected into the unified molding cavity to form the one-piece key fob. Finally, the molding cavity cover 20 is raised and the molded key fob is ejected.

Variations or modifications to the subject matter of this invention may occur to those skilled in the art upon reviewing the invention as described herein. Such variations, if within the spirit of this development, are intended to be encompassed within the scope of this invention, as described. The description of the preferred embodiment as set forth herein is done so for illustrative purposes only.

We claim:

1. An injection molding machine comprising:

an injection mold having a mold portion defining a mold blank recess and a mold portion cavity, the mold portion cavity being adapted to mold an extending tab of a key fob and the mold blank cavity being adapted to accept a mold blank, to mold a base portion integrally of the key fob;

a plurality of mold blanks, each defining a mold blank cavity of varying size and shape, and provided for selective molding of a base portion of the key fob integrally with its extending tab of the size and shape from the selected mold blank cavity;

wherein the mold blank recess is adapted to accept one of a plurality of said mold blanks, the mold blank cavity and the mold portion cavity together forming a unified molding cavity for molding the integral key fob; and wherein the unified molding cavity is adapted to receive a melted polymer to form the one-piece integral key fob.

* * * * *